(12) United States Patent
Choi

(10) Patent No.: US 9,760,763 B2
(45) Date of Patent: Sep. 12, 2017

(54) SYSTEM AND METHOD FOR DETECTING FEATURE POINTS OF FACE

(71) Applicant: Research Cooperation Foundation of Yeungnam University, Gyeongsangbuk-do (KR)

(72) Inventor: Hyun Chul Choi, Gyeongsangbuk-do (KR)

(73) Assignee: RESEARCH COOPERATION FOUNDATION OF YEUNGHAM UNIVERSITY, Gyeongsangbuk-Do (KR)

(*) Notice: Subject to any disclaimer, the term of this patent is extended or adjusted under 35 U.S.C. 154(b) by 0 days.

(21) Appl. No.: 14/989,236

(22) Filed: Jan. 6, 2016

(65) Prior Publication Data
US 2017/0061198 A1    Mar. 2, 2017

(30) Foreign Application Priority Data
Aug. 25, 2015   (KR) .................. 10-2015-0119387

(51) Int. Cl.
*G06K 9/00* (2006.01)
*G06T 7/00* (2017.01)

(52) U.S. Cl.
CPC ..... *G06K 9/00268* (2013.01); *G06K 9/00281* (2013.01); *G06K 9/00288* (2013.01); *G06T 7/0042* (2013.01); *G06T 2207/30201* (2013.01)

(58) Field of Classification Search
CPC ............ G06K 9/00268; G06K 9/00288; G06T 7/0042; G06T 2207/30201
See application file for complete search history.

(56) References Cited

U.S. PATENT DOCUMENTS

| 2004/0213454 A1* | 10/2004 | Lai ...................... G06K 9/00268 382/159 |
| 2009/0116749 A1* | 5/2009 | Cristinacce ............ G06K 9/621 382/195 |
| 2013/0022263 A1* | 1/2013 | Metaxas ............ G06K 9/00335 382/159 |

FOREIGN PATENT DOCUMENTS

KR    10-2015-0088157 A    7/2015

OTHER PUBLICATIONS

Office action dated Sep. 1, 2016 from Korean Intellectual Property Office in a counterpart Korean Patent Application No. 10-2015-0119387.
Tatsuo Kozakaya et al., Facial Feature Localization Using Weighted Vector Concentration Approach, Image and Vision Computing 28 (2010), pp. 772-780.

* cited by examiner

*Primary Examiner* — Phuoc Tran
(74) *Attorney, Agent, or Firm* — The PL Law Group, PLLC

(57) ABSTRACT

Disclosed are a system and a method for detecting feature points of a face. The system for detecting feature points of a face include: a training unit configured to divide each of a plurality of facial images into segments of a predetermined size, and generate an eigen-codebook representing a correlation between a feature vector of each of the divided segments and location of a predetermined feature point in the facial image; and a detection unit configured to detect a facial area from a target image, divide the facial area into segments of a predetermined size, detect a feature vector of each of the divided segments of the facial area, and detect a location of a feature point in the facial area by using the detected feature vector and the eigen-codebook.

12 Claims, 6 Drawing Sheets

SYSTEM AND METHOD FOR DETECTING FEATURE POINTS OF FACE

CROSS-REFERENCE TO RELATED APPLICATION

This application claims priority to and the benefit of Korean Patent Application No. 10-2015-0119387, filed on Aug. 25, 2015, the disclosure of which is incorporated herein by reference in its entirety.

BACKGROUND

1. Field

The present disclosure relates to technology for detecting feature points of a face.

2. Discussion of Related Art

With image processing technology being developed, a technology of recognizing a face from a target image has been commercialized. In order to recognize a face, generally, facial feature points need to be detected and the detecting of feature points of a face is generally implemented using a method of comparing patterns of a target image and a facial image for training. However, the conventional technology has inconvenience that local patterns corresponding to facial feature points need to be individually extracted, and in this case, a great amount of time is taken for extracting the local patterns, and a storage space is wasted with the local patterns being stored. In addition, the detecting of facial feature points needs to use a separate pattern searching algorithm, which has a great complexity of computation used in detecting feature points. Further, the conventional pattern search is implemented using a method of comparing pixel values of images, and in this case, the accuracy in detecting feature points may be lowered depending on change in brightness of the image and illumination of a surrounding environment.

SUMMARY

The present disclosure is directed to technology for rapidly and accurately detecting the location of a feature point in a facial area of a target image.

According to an aspect of the present disclosure, there is provided a system for detecting a feature point of a face, the system including a training unit and a detection unit. The training unit may be configured to divide each of a plurality of facial images into segments of a predetermined size, and generate an eigen-codebook representing a correlation between a feature vector of each of the divided segments and location of a predetermined feature point in the facial image. The detection unit may be configured to detect a facial area from a target image, divide the facial area into segments of a predetermined size, detect a feature vector of each of the divided segments of the facial area, and detect a location of a feature point in the facial area by using the detected feature vector and the eigen-codebook.

The training unit may be configured to obtain $M^s = [h_1^s, \ldots, h_n^s]$ by applying a predetermined feature point detection algorithm to each segment of the facial image, obtain $M_E^s = [h_{ave}^s, h_{e1}^s, \ldots, h_{eP^s}^s]$ by applying Principal Component Analysis (PCA) algorithm to the $M^s$, and generate the eigen-codebook by using the $M^s$ and the $M_E^s$, wherein $h_n^s$ may be data of a feature vector of a segment s of a $n^{th}$ facial image, M may be a matrix, $h_{ave}^s$ may be an average among data $h_1^s \ldots$ and $h_n^s$, $h_{eP^s}^s$ may represent a piece of eigen data obtained by applying the PCA algorithm to data $h_1^s \ldots$ and $h_n^s$, and when a piece of eigen data $h_{ei}^s$ has an eigen value of $\lambda_{ei}^s$, $\lambda_{e1}^s > \ldots > \lambda_{eP}^s$, and $P^s$ may be a total number of data $h_{e1}^s \ldots$ and $h_{eP^s}^s$.

The training unit may be configured to calculate $C^s$ that represents a correlation between the $M^s$ and the $M_E^s$ and satisfies $M^s \cdot C^s = M_E^s$, and generate the eigen-codebook by using the $C^s$, wherein $\cdot$ represents a matrix multiplication.

The training unit may be configured to calculate a direction vector $V^{s,k}$ from a center of the segment s of the $n^{th}$ facial image to a predetermined feature point k of the facial image, the direction vector $V^{s,k}$ satisfying $V^{s,k} = [v_1^{s,k}, \ldots, v_n^{s,k}] \in \Re^{2 \times n}$, and to calculate $V_{EDV}^{s,k}$ by using $V_{EDV}^{s,k} = V^{s,k} \cdot C^s$, wherein the eigen-codebook may include the $V_{EDV}^{s,k}$.

The detection unit may be configured to obtain $h^s$ by applying a predetermined feature point detection algorithm to each segment of the facial area, obtain $c_i^s$ by representing the $h^s$ as a combination of values of the $M_E^s$ by using $$h^s \approx h_{ave}^s + \sum_{i=1}^{P^s} c_i^s h_{ei}^s$$

and $c_i^s = \langle h^s - h_{ave}^s, h_{ei}^s \rangle$ in which $\langle a, b \rangle$ is an inner product of a and b, and detect the location of the feature point of the facial area by using the $c_i^s$.

The detection unit may be configured to represent a direction vector $v^{s,k}$ from a center of the segment s of the facial area to the feature point k as a combination of values of the $V_{EDV}^{s,k}$ by using $$v^{s,k} = v_{ave}^{s,k} + \sum_{i=1}^{P^s} c_i^s v_{ei}^{s,k},$$

and detect the location of the feature point of the facial area by using the $v^{s,k}$.

The detection unit may be configured to detect the location of the feature point of the facial area by determining a location coordinate of the feature point k at which the summation of the distances between the coordinate and the direction vectors from centers of the respective segments of the facial area to the feature point k.

According to another aspect of the present disclosure, there is provided a method for detecting a feature point of a face, the method including: dividing, by a training unit, each of a plurality of facial images into segments of a predetermined size; generating, by the training unit, an eigen-codebook representing a correlation between a feature vector of each of the divided segments and location of a predetermined feature point in the facial image; detecting, by a detection unit, a facial area from a target image; dividing, by the detection unit, the facial area into segments of a predetermined size; detecting, by the detection unit, a feature vector of each of the divided segments of the facial area; and detecting, by the detection unit, a location of a feature point in the facial area by using the detected feature vector and the eigen-codebook.

The generating of the eigen-codebook may include: obtaining $M^s = [h_1^s, \ldots, h_s^s]$ by applying a predetermined feature point detection algorithm to each segment of the facial image; obtaining $M_E^s = [h_{ave}^s, h_{e1}^s, \ldots, h_{eP^s}^s]$ by applying the Principal Component Analysis (PCA) algorithm to the $M^s$; and generating the eigen-codebook by using the $M^s$ and the $M_E{}^s$, wherein $h_n{}^s$ may be data of a feature vector of a segment s of a $n^{th}$ facial image, M may be a matrix, $h_{ave}{}^s$ may be an average among data $h_1{}^s \ldots$ and $h_n{}^s$, $h_{eP}{}^s$ may represent a piece of eigen data obtained by applying the PCA algorithm to data $h_1{}^s \ldots$ and $h_n{}^s$, and when a piece of eigen data $h_{ei}{}^s$ has an eigen value of $\lambda_{ei}{}^s$, $\lambda_{e1}{}^s > \ldots > \lambda_{eP}{}^s$, and $P^s$ may be a total number of data $h_{e1}{}^s \ldots$ and $h_{eP}{}^s$.

The generating of the eigen-codebook by using the $M^s$ and the $M_E{}^s$ may include: calculating $C^s$ that represents a correlation between the $M^s$ and the $M_E{}^s$ and satisfies $M^s \cdot C^s = M_E{}^s$ in which · represents a matrix multiplication; and generating the eigen-codebook by using the $C^s$.

The generating of the eigen-codebook by using the $C^s$ may include: calculating a direction vector $V^{s,k}$ from a center of the segment s of the $n^{th}$ facial image to a predetermined feature point k of the facial image, the direction vector $V^{s,k}$ satisfying $V^{s,k} = [v_1{}^{s,k}, \ldots, v_n{}^{s,k}] \in \mathfrak{R}^{2 \times n}$; and calculating $V_{EDV}{}^{s,k}$ by using $V_{EDV}{}^{s,k} = V^{s,k} \cdot C^s$, wherein the eigen-codebook may include the $V_{EDV}{}^{s,k}$.

The detecting of a location of a feature point may include: obtaining $h^s$ by applying a predetermined feature point detection algorithm to each segment of the facial area; obtaining $c_i{}^s$ by representing the $h^s$ as a combination of values of the $M_E{}^s$ by using $$h^s \approx h_{ave}^s + \sum_{i=1}^{P^s} c_i^s h_{ei}^s$$

and $c_i{}^s = \langle h^s - h_{ave}{}^s, h_{ei}{}^s \rangle$ in which $\langle a, b \rangle$ is an inner product of a and b; and detecting the location of the feature point of the facial area by using the $c_i{}^s$.

The detecting of the location of the feature point of the facial area by using the $c_i{}^s$ may include: representing a direction vector $v^{x,k}$ from a center of the segment s of the facial area to the feature point k as a combination of values of the $V_{EDV}{}^{s,k}$ by using $$v^{s,k} = v_{ave}^{s,k} + \sum_{i=1}^{P^s} c_i^s v_{ei}^{s,k};$$

and detecting the location of the feature point of the facial area by using the $v^{x,k}$.

In the detecting of the location of the feature point of the facial area by using the $v^{s,k}$, the location of the feature point of the facial area may be detected by determining a location coordinate of the feature point k at which the summation of the distances between the coordinate and the direction vectors from centers of the respective segments of the facial area to the feature point k.

As is apparent from the above, according to exemplary embodiments of the present disclosure, statistical inference based on a plurality of training facial images is used instead of extracting local patterns at one point of a face, and thus the location of a feature point in a facial area of a target image can be rapidly and accurately detected. In addition, according to exemplary embodiments of the present disclosure, a pre-trained eigen-codebook is used, thereby minimizing the computational complexity in detecting a feature point and also minimizing the size of a storage, compared with the conventional technology using a pattern searching algorithm. Further, the facial feature point detection according to exemplary embodiments of the present disclosure can be easily implemented on low-performance hardware, such as a mobile application.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present disclosure will be described in detail below with reference to the accompanying drawings. The following description is intended to provide a general understanding of the method, apparatus and/or system described in the specification, but it is illustrative in purpose only and should not be construed as limiting the present disclosure.

In describing the present disclosure, detailed descriptions that are well-known but are likely to obscure the subject matter of the present disclosure will be omitted in order to avoid redundancy. The terminology used herein is defined in consideration of its function in the present disclosure, and may vary with an intention of a user and an operator or custom. Accordingly, the definition of the terms should be determined based on overall contents of the specification. The terminology used herein is for the purpose of describing particular embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
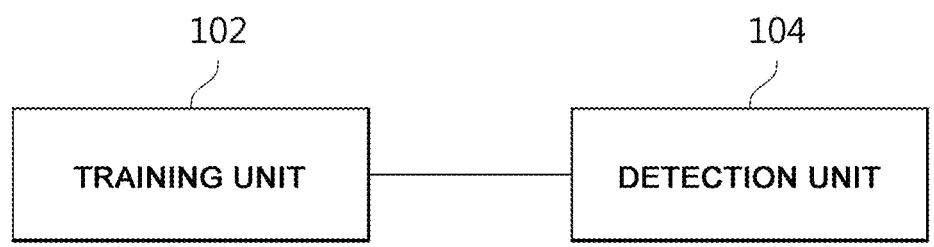
FIG. 1 is a block diagram illustrating a detailed configuration of a system for detecting feature points of a face according to an exemplary embodiment of the present disclosure.

FIG. 1 is a block diagram illustrating a detailed configuration of a system for detecting facial feature points 100 according to an exemplary embodiment of the present disclosure. Referring to FIG. 1, the facial feature point detecting system 100 according to an exemplary embodiment of the present disclosure includes a training unit 102 and a detection unit 104.

The training unit 102 is a module configured to generate an eigen-codebook based on a plurality of facial images. According to exemplary embodiments of the present disclosure, the eigen-codebook is a set of a plurality of pieces of information representing correlations between a feature vector of each segment of a facial image and location of a predetermined feature point in the facial image. The detection unit 104, which will be described below, may rapidly and accurately detect the location of a feature point in a facial area of a target image by using the eigen-codebook. In addition, the facial image is an image for training used to generate the eigen-codebook, and may include a facial area of a human. The facial image, for example, may be an image obtained by applying Adaboost algorithm to an input image such that areas except for a facial area are removed. The training unit 102 may generate the eigen-codebook by using a plurality of facial images including facial areas of unspecified individuals. For example, in order to generate an eigen-codebook, 100 to 150 facial images may be used, but the number of facial images used to generate an eigen-codebook is not limited thereto.

Figure 2:
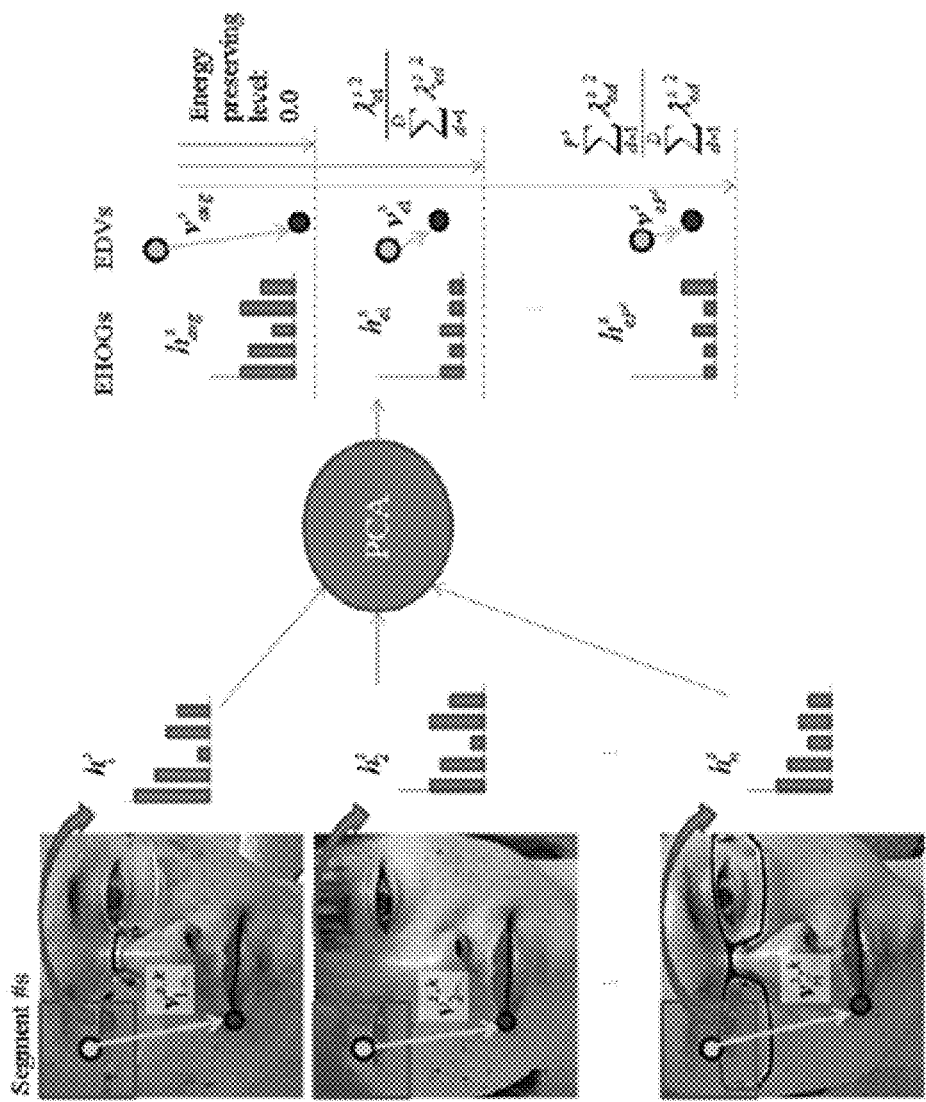
FIG. 2 is a diagram illustrating a process of generating an eigen-codebook in a training unit according to an exemplary embodiment of the present disclosure.

Referring to FIG. 2, a process of generating an eigen-codebook in the training unit 102 is described in detail. First, the training unit 102 may divide each of a plurality of facial images into segments each having a predetermined size. For example, the training unit 102 may adjust a size of the facial image to 72×72 pixels, and divide the facial image into 9×9 grids, so that 81 segments are obtained. The segment may be provided in the form of a quadrangle as an example, but the shape and number of segments in the facial image are not limited thereto.

Then, the training unit 102 may calculate a feature vector by applying a predetermined feature point detection algorithm to each segment of the facial image. The feature point detection algorithm may be Histogram of Oriented Gradients (HOG), Scale Invariant Feature Transform (SIFT), and Speeded Up Robust Features (SURF), etc. However, the feature point detection algorithm is not limited thereto. For convenience sake of description, the training unit 102 is assumed to use the HOG algorithm in calculating a feature vector. The HOG algorithm is a histogram characterized in the distribution of gradients and edge directions. The training unit 102 may calculate a feature vector of each segment of the facial image by using the HOG algorithm. The HOG algorithm, using edge direction information, is less sensitive to the brightness of an image and the change of illumination of a surrounding environment. When it is assumed that n facial images exist, $h_n^s$ is a piece of data regarding a feature vector at a segment s of a $n^{th}$ facial image (for example, histogram data). When $M^s$ refers to a set of data $h_1^s$ ... and $h_n^s$ obtained by applying the feature point detection algorithm to each segment of the facial image, the $M^s$ is represented as Equation below.

$$M^s = [h_1^s, \ldots, h_n^s],\qquad\text{[Equation]}$$

herein, M is a matrix, and histogram data of feature vectors of a $n^{th}$ facial image may be included in each column of the $M^s$.

Then, the training unit 102 may obtain $M_E^s$ by applying Principal Component Analysis (PCA) algorithm to $M^s$. The PCA algorithm is a linear recognition algorithm using statistical information of a second moment. The training unit 102 may obtain eigen-features by using the PCA algorithm. A process of obtaining $M_E^s$ by applying the PCA algorithm to $M^s$ is sequentially described as follows:

(1) Obtain an average $h_{ave}^s$ among $h_1^s$ ... and $h_n^s$
(2) Subtract the average $h_{ave}^s$ from each of $h_1^s$ ... and $h_n^s$
(3) Generate a covariance matrix
(4) Obtain eigen values and eigen vectors by using the covariance matrix
(5) Obtain eigen data (or eigen histograms) ($h_{e1}^s$ ... and $h_{eP^s}^s$).

The $M_E^s$ may be represented as Equation below.

$$M_E^s = [h_{ave}^s, h_{e1}^s, \ldots, h_{eP^s}^s]\qquad\text{[Equation]}$$

herein, $h_{ave}^s$ represents an average among $h_1^s$ ... and $h_n^s$, and $h_{eP^s}^s$ represents a piece of eigen data (an eigen histogram) obtained by applying the PCA algorithm to $h_1^s$ ... and $h_n^s$. When a piece of eigen data $h_{ei}^s$ has an eigen value of $\lambda_{ei}^s$, $\lambda_{e1}^s > \ldots > \lambda_{eP^s}^s$, and $P^s$ is a total number of data $h_{e1}^s$ ... and $h_{eP^s}^s$. That is, when the feature vectors are analyzed, a greatest distribution is shown in a direction of $h_{e1}^s$. $P^s$ is the number of eigen data used when generating an eigen-codebook among $h_1^s$ ... and $h_n^s$, and the $P^s$ may vary with an energy preserving level shown in FIG. 1. The energy preserving level may be expressed as Equation below. A denominator of the energy preserving level is a summation of the squares of eigen values, and a numerator of the energy preserving level is a summation of the squares of eigen values corresponding to principal components desired to be used. In this case, D=n−1.

$$\frac{\sum_{d=1}^{P^s} \lambda_{ed}^{s\,2}}{\sum_{d=1}^{D} \lambda_{ed}^{s\,2}}\qquad\text{[Equation]}$$

When it is assumed that a piece of data $h_n^s$ having a smaller eigen value is close to noise and all of $h_1^s$ ... and $h_n^s$ corresponding to respective eigen values are used, the energy preserving level is 100%. When data $h_n^s$ is removed one by one starting from a $h_n^s$ having the smallest eigen value, the energy preserving level gradually decreases. That is, depending on a degree to which noise is removed in generating an eigen-codebook, $P^s$ may be varied. The $P^s$ may be appropriately set in consideration of the number of facial images, the number of segments of the facial image, and the number of predetermined feature points in the facial image.

Each column vector of $M_E^s$ may be provided as a linear combination of column vectors of $M^s$ as shown in Equation below. That is, each principal component may be represented as a linear combination of histogram data of feature vectors.

$$M^s \cdot C^s = M_E^s\qquad\text{[Equation]}$$

herein, · represents a matrix multiplication. The $C^s$ is a coefficient matrix, and represents a correlation between the $M^s$ and the $M_E^s$. For example, $C^s$ may be calculated as Equation below.

$$C^s = (M_{HOG}^{s\,T} \cdot M_{HOG}^s)^{-1} M_{HOG}^{s\,T} \cdot M_{EHOG}^s,\qquad\text{[Equation]}$$

herein, $C^s \in \mathfrak{R}^{n \times (P^s+1)}$, and R is a real number, and T is a transposed matrix. Although $C^s$ is calculated using the above Equation as an example, the method of calculating $C^s$ is not limited thereto.

Thereafter, the training unit 102 may calculate eigen directional vectors with respect to predetermined feature points in a facial image respectively by using the $C^s$. The feature points may be a portion that is able to represent characteristics of a face, for example, corners of a mouth, eyes, a nose, a mouth. The training unit 102 may calculate a direction vector $V^{s,k}$ from a center of a segment s of a $n^{th}$ facial image to a predetermined feature point k in the facial image as shown in Equation below, and may calculate an eigen directional vector $V_{EDV}^{s,k}$ by using the $V^{s,k}$. Herein, R represents a real number.

$$V^{s,k} = [v_1^{s,k}, \ldots, v_n^{s,k}] \in \Re^{2 \times n} \quad \text{[Equation]}$$

The training unit 102 may calculate the eigen directional vector $V_{EDV}^{s,k}$ by using Equation below.

$$V_{EDV}^{s,k} = V^{s,k} \cdot C^s \quad \text{[Equation]}$$

As described above, the training unit 102 may acquire direction vectors corresponding to respective column vectors (principal components) of $M_E^s$. That is, the training unit 102 may represent a correlation between a feature vector of each segment of a facial image and location of a predetermined feature point in the facial image by using the $C^s$.

The eigen-codebook may include the $V_{EDV}^{s,k}$.

The process of generating the eigen-codebook in the training unit 102 may be performed as a pre-processing before a feature point detection process of the detection unit 104. According to exemplary embodiments of the present disclosure, only feature vectors of predetermined segments are used without performing a pre-alignment having a high complexity. Accordingly, the time taken to detect a feature point of a face is minimized. In addition, unlike the conventional technology in which a feature vector is extracted using a pixel value, the system and method for detecting feature points of a face according to exemplary embodiments of the present disclosure may extract a feature vector of a facial image by using the HOG algorithm, ensuring a low sensitivity to the changes of a lighting and a person's posture and improving accuracy in detecting the location of a feature point.

The detection unit 104 detects the location of a feature point in a facial area of a target image by using the eigen-codebook generated by the training unit 102. Here, the target image may be an image whose feature points are to be detected, and may include a facial area of a human. Although the target image may be a captured image or photo of a facial area of a human or a computer graphic including a facial area of a human, the type of the target image is not limited thereto.

Figure 3:
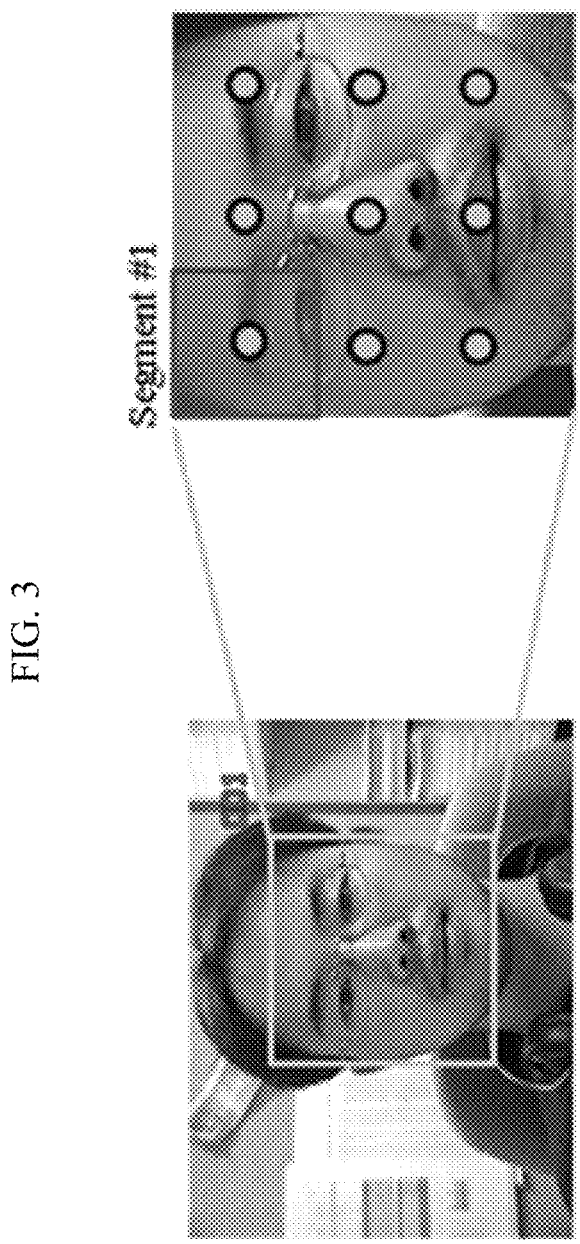
FIG. 3 is a diagram illustrating a process of detecting a facial area and dividing the detected facial area into segments each having a predetermined size in a detection unit according to an exemplary embodiment of the present disclosure.
Figure 4:
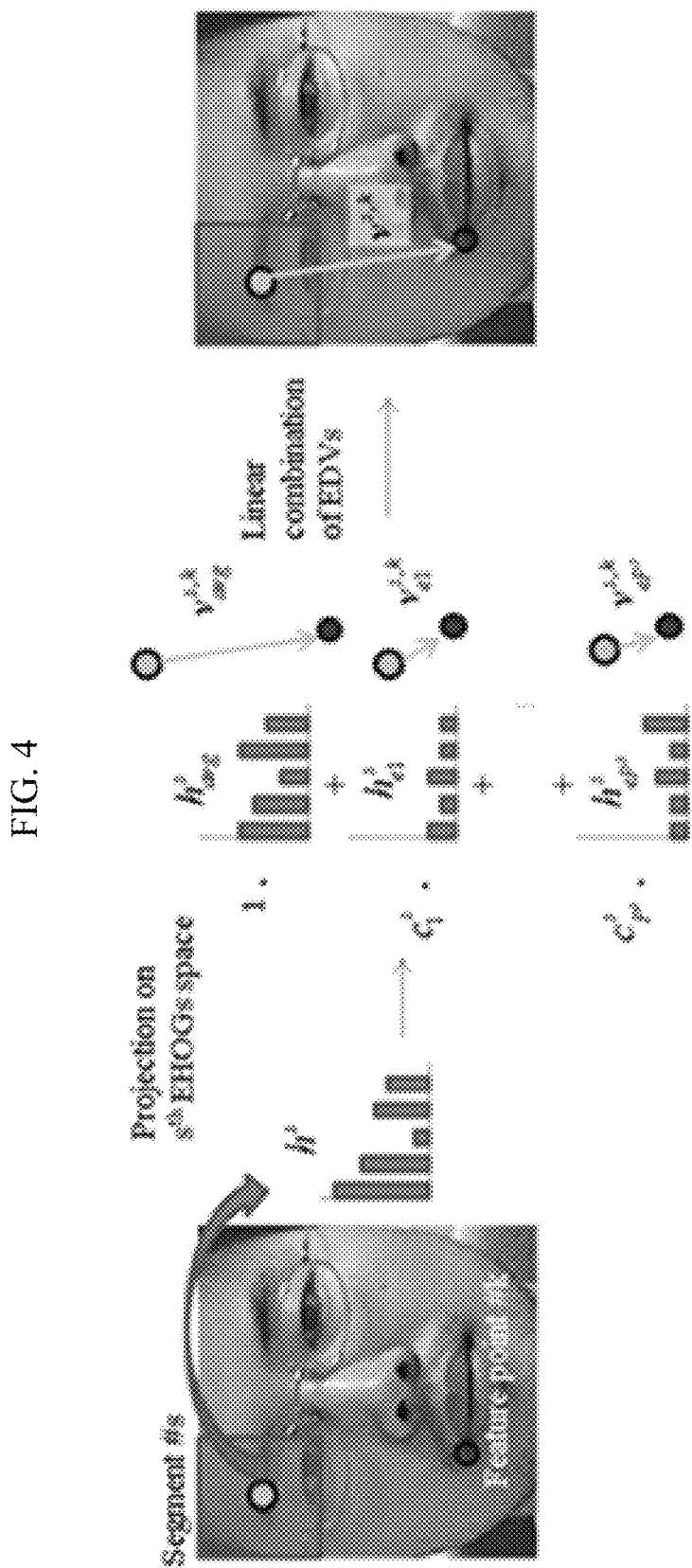
FIG. 4 is a diagram illustrating a process of obtaining a direction vector from a center of a segment of the facial area to a feature point according to an exemplary embodiment of the present disclosure.
Figure 5:
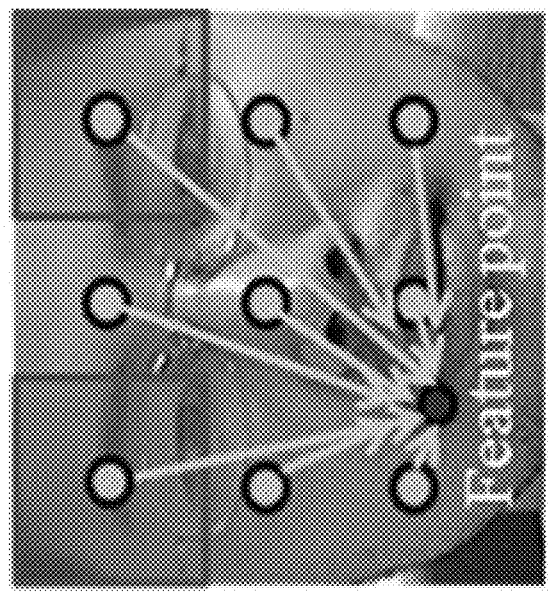
FIG. 5 is a diagram illustrating a process of determining location coordinates of the feature point in the detection unit according to an exemplary embodiment of the present disclosure.

Referring to FIGS. 3 to 5, a process of detecting the location of a feature point of a facial area of a target image in the detection unit 104 is described in detail. First, referring to FIG. 3, the detection unit 104 may detect a facial area from a target image. The detection unit 104 may detect a facial area from a target image by using the Adaboost algorithm as an example, but the method of detecting a facial area from a target image in the detection unit 104 is not limited thereto. In FIG. 3, a facial area detected by the detection unit 104 is illustrated as a quadrangle. Then, the detection unit 104 may divide the facial area into predetermined sizes. The detection unit 104 may adjust a size of the facial area to 72×72 pixels, and divide the facial area into 9×9 grids, so that 81 segments are obtained. However, the shape and number of segments of a facial area are not limited thereto.

Referring to FIG. 4, the detection unit 104 may detect a feature vector of each segment of the facial area. The detection unit 104 may calculate a feature vector by applying a predetermined feature point detection algorithm to each segment of the facial area. For example, the detection unit 104 may calculate a feature vector by applying the HOG algorithm to each segment of the facial area. However, the method of calculating a feature vector in the detection unit 104 is not limited thereto, and the detection unit 104 may calculate a feature vector by using various algorithms, such as SIFT and SURF. In FIG. 4, a feature vector of a segment s is represented using $h^s$. The $h^s$ may be represented as a linear combination of values of the $M_E^s$ of the eigen-codebook as shown in Equation below. For example, the detection unit 104 may obtain $c_i^s$ by projecting $h^s$ onto an HOG space. As described in the previous training process of the training unit 102, principal components of a statistical histogram and principal components of a direction vector are obtained from histogram data of feature vectors, and histogram data of a certain feature vector is represented, using the principal component of a histogram, with a minimum error as shown in Equation below. Herein, ≈ may be indicated as =.

$$h^s \approx h_{ave}^s + \sum_{i=1}^{p^s} c_i^s h_{ei}^s, \quad \text{[Equation]}$$

herein, principal components except for $h_{ave}^s$, that is, $h_1^s$ to $h_{ep^s}^s$ are orthogonal to each other. Accordingly, $c_i^s$ is easily obtained by an inner product of a value of $h^s$ minus $h_{ave}^s$ and each principal component, which is expressed as Equation below.

$$c_i^s = \langle h^s - h_{ave}^s, h_{ei}^s \rangle, \quad \text{[Equation]}$$

herein, ⟨a, b⟩ represents an inner product of a and b.

In addition, the detection unit 104 may represent a direction vector $v^{s,k}$ from a segment s of a facial area to a feature point k as a linear combination of values of the $V_{EDV}^{x,k}$ by using Equation below.

$$v^{s,k} = v_{ave}^{s,k} + \sum_{i=1}^{p^s} c_i^s v_{ei}^{s,k} \quad \text{[Equation]}$$

In this process, the detection unit 104 may obtain a direction vector $v^{s,k}$ from a center of a segment s of a facial area to a feature point k. The detection unit 104, which has information regarding the location of the center of the segment s, may obtain location coordinates (x, y) of the feature point k by using the location information and the direction vector $v^{s,k}$. That is, the detection unit 104 adds the direction vector $v^{s,k}$ to the coordinates of the center of the segment s, and determines location coordinates of an end point of the added direction vector $v^{x,k}$ as location coordinates (x, y) of the feature point k.

In addition, referring to FIG. 5, the detection unit 104 may determine a location coordinate of the feature point k at which the summation of the distances between the coordinate and the direction vectors from centers of the respective segments of the facial area to the feature point k.

In this process, the detection unit 104 calculates direction vectors from the centers of the respective segments of the facial area to the feature point k, and by using the sizes of the calculated direction vectors, determines the final location coordinates of the feature point k. The respective direction vectors shown in FIG. 5 are not guaranteed to meet at one point. Thus, according to exemplary embodiments of the present to disclosure, the detection unit 104 calculates coordinates at which sizes of the respective direction vectors of FIG. 5 are smallest as the optimum solution of the location coordinates (x, y) of the feature point k, and determines the coordinates as the final location coordinates of the feature point k. The location coordinates (x, y) of the feature point k are calculated using Equation below.

$$\underset{x,y}{\operatorname{argmin}} \sum_{s=1}^{S} w_s^2 \|a_s x + b_s y + c_s\|^2 \qquad \text{[Equation]}$$

herein, ($a_s$, $b_s$, $c_s$) represents a coefficient that satisfies $a_s x + b_s y + c_s = 0$ at $a_s^2 + b_s^2 = 1$, and S is the number of segments of a facial area. In this case, a weight $w_s$ is given to the size of each direction vector, and the $w_s$ is calculated through Equation below.

$$w_s = w_s^s \cdot e^{-\frac{d^2}{L^2}} \qquad \text{[Equation]}$$

$$w_s^s = \left\langle h^s, h_{ave}^s + \sum_{i=1}^{P^s} c_i^s h_{ei}^s \right\rangle$$

That is, $w_s$ is calculated by multiplying a similarity between a feature vector $h^s$ and principal component representations of feature vectors obtained through an inner product by a value that exponentially decreases in consideration of a distance between a feature point of a facial area and a segment. Herein, d represents a distance between a center of a segment s and a feature point, and L represents a half length of a quadrangle representing a segment.

In this case, $w_s$ may be defined according to an eigen value of $M_E^s$ as shown in Equation below.

$$w_s = \begin{cases} w_s & \text{if } |c_{ej}^s| < 2.5\lambda_{ej}^s \text{ for } j = 1 \ldots P^s \\ 0 & \text{otherwise} \end{cases} \qquad \text{[Equation]}$$

The above Equation is provided to consider occlusion of at least one portion of a target image, in which eigen values ($\lambda_{e1}^s, \ldots, \lambda_{eP^s}^s$) of $M_E^s$ are used. Herein, $c_{ej}^s$ (or $c_i^s$) is a projection coefficient obtained by projecting $h^s$ onto an eigen HOG space. The detection unit 104 may use the weight $w_s$ as it is if each projection coefficient (a principal component coefficient) exists within a range of 2.5 times of a square of an eigen value, and if not, the weight $w_s$ regarded as 0 and is not reflected on calculation of location coordinates (x, y) of the feature point k. That is, the above Equation is provided to determine whether a feature vector is present in the existing feature vector principal component space. The coefficient is illustrated as 2.5, but the present disclosure is not limited thereto. For example, the coefficient may be 2.3 or any other number.

According to exemplary embodiments of the present disclosure, statistical inference based on a plurality of facial images for training is used instead of extracting local patterns at one point of a face, so that the location of a feature point in a facial area of a target image can be rapidly and accurately detected. In addition, according to exemplary embodiments of the present disclosure, a pre-trained eigen-codebook is used, thereby minimizing the computational complexity in detecting a feature point and taking a minimized storage, compared with the conventional technology using a pattern searching algorithm. Further, the facial feature point detection according to exemplary embodiments of the present disclosure can be easily implemented on low-performance hardware, such as a mobile application.

That is, the method of detecting a facial feature point according to exemplary embodiments of the present disclosure can significantly reduce the total time taken to detect facial feature points and significantly reducing the required storage while having a small difference in the accuracy of detecting facial feature points, compared to when using the conventional search algorithm, such as approximate nearest-neighbor search (ANNS) and nearest neighbor search (NNS).

The above modules of the system for detecting facial feature points 100 may be implemented with hardware. For example, the system for detecting facial feature points 100 may be implemented or included in a computing apparatus. The computing apparatus may include at least one processor and a computer-readable storage medium such as a memory that is accessible by the processor. The computer-readable storage medium may be disposed inside or outside the processor, and may be connected with the processor using well known means. A computer executable instruction for controlling the computing apparatus may be stored in the computer-readable storage medium. The processor may execute an instruction stored in the computer-readable storage medium. When the instruction is executed by the processor, the instruction may allow the processor to perform an operation according to an example embodiment. In addition, the computing apparatus may further include an interface device configured to support input/output and/or communication between the computing apparatus and at least one external device, and may be connected with an external device (for example, a device in which a system that provides a service or solution and records log data regarding a system connection is implemented). Furthermore, the computing apparatus may further include various different components (for example, an input device and/or an output device), and the interface device may provide an interface for the components. Examples of the input device include a pointing device such as a mouse, a keyboard, a touch sensing input device, and a voice input device, such as a microphone. Examples of the output device include a display device, a printer, a speaker, and/or a network card. Thus, the training unit 102 and the detection unit 104 of the system for detecting facial feature points 100 may be implemented as hardware of the above-described computing apparatus.

Figure 6:
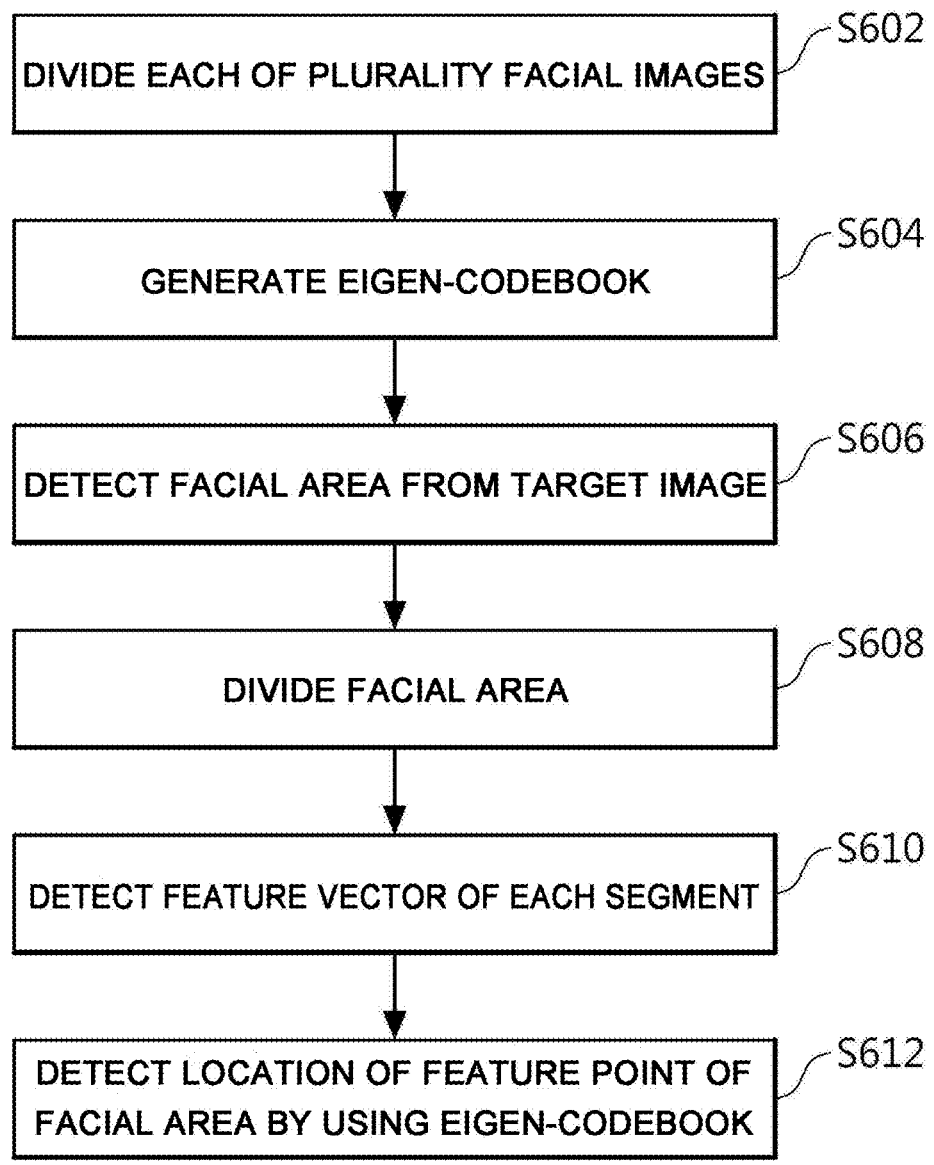
FIG. 6 is a flowchart showing a method for detecting facial feature points of a face according to an exemplary embodiment of the present disclosure.

FIG. 6 is a flowchart showing a method for detecting facial feature points according to an exemplary embodiment of the present disclosure. In the flowchart shown in FIG. 6, the method is illustrated as being divided into a plurality of operations. However, at least one of the operations may be performed in a changed order, concurrently performed in combination with other operations, omitted, sub-divided, or one or more additional operations which are not illustrated in the diagram may be performed.

First, the training unit 102 divides each of a plurality of facial images into segments of a predetermined size (S602). For example, the training unit 102 may adjust a size of each facial image to 72×72 pixels, and divide the facial image into 9×9 grids, so that 81 segments are obtained.

Then, the training unit 102 generates an eigen-codebook representing a correlation between a feature vector of each segment of the facial image and location of a predetermined feature point in the facial image (S604). The method of generating the eigen-codebook in the training unit 102 has been described above in detail, and detailed description thereof will be omitted.

Then, the detection unit 104 detects a facial area from a target image (S606). For example, the detection unit 104 may detect a facial area from a target image by using the Adaboost algorithm.

Then, the detection unit 104 divides the facial area into segments of a predetermined size (S608).

Then, the detection unit 104 detects a feature vector of each segment of the facial area (S610). The detection unit 104 may calculate a feature vector by applying the HOG algorithm to each segment of the facial area.

Finally, the detection unit 104 detects the location of a feature point of the facial area by using the detected feature vector and the eigen-codebook (S612). Since the method of detecting the location of the feature point of the facial area by using the eigen-codebook has been described above, detailed description thereof will be omitted.

It will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

What is claimed is:

1. A system for detecting a feature point of a face, the system comprising:
   a training unit implemented in a computing apparatus configured to divide each of a plurality of facial images into segments of a predetermined size, and generate an eigen-codebook representing a correlation between a feature vector of each of the divided segments and location of a predetermined feature point in the facial image; and
   a detection unit implemented in a computing apparatus configured to detect a facial area from a target image, divide the facial area into segments of a predetermined size, detect a feature vector of each of the divided segments of the facial area, and detect a location of a feature point in the facial area by using the detected feature vector and the eigen-codebook,
   wherein the training unit is configured to obtain $M^s = [h_1^s, \ldots, h_n^s]$ by applying a predetermined feature point detection algorithm to each segment of the facial image, obtain $M_E^s = [h_{ave}^s, h_{e1}^s, \ldots, h_{eP^s}^s]$ by applying Principal Component Analysis (PCA) algorithm to the $M^s$, and generate the eigen-codebook by using the $M^s$ and the $M_E^s$, wherein $h_n^s$ is data of a feature vector of a segment s of a $n^{th}$ facial image, M is a matrix, $h_{ave}^s$ may be an average among data $h_1^s \ldots$ and $h_n^s$, $h_{eP^s}^s$ may represent a piece of eigen data obtained by applying the PCA algorithm to data $h_1^s \ldots$ and $h_n^s$, and when a piece of eigen data $h_{ei}^s$ has an eigen value of $\lambda_{ei}^s$, $\lambda_{e1}^s > \ldots > \lambda_{eP^s}^s$, and $P^s$ is a total number of data $h_{e1}^s \ldots$ and $h_{eP^s}^s$.

2. The system of claim 1, wherein the training unit is configured to calculate $C^s$ that represents a correlation between the $M^s$ and the $M_E^s$ and satisfies $M^s \cdot C^s = M_E^s$, and generate the eigen-codebook by using the $C^s$,
   wherein · represents a matrix multiplication.

3. The system of claim 2, wherein the training unit is configured to calculate a direction vector $V^{s,k}$ from a center of the segment s of the $n^{th}$ facial image to a predetermined feature point k of the facial image, the direction vector $V^{s,k}$ satisfying $V^{s,k} = [v_1^{s,k}, \ldots, v_n^{s,k}] \in \Re^{2 \times n}$, and to calculate $V_{EDV}^{s,k}$ by using $V_{EDV}^{s,k} = V^{s,k} \cdot C^s$, wherein the eigen-codebook includes the $V_{EDV}^{s,k}$.

4. The system of claim 3, wherein the detection unit is configured to obtain $h^s$ by applying a predetermined feature point detection algorithm to each segment of the facial area, obtain $c_i^s$ by representing the $h^s$ as a combination of values of the $M_E^s$ by using $$h^s \approx h_{ave}^s + \sum_{i=1}^{P^s} c_i^s h_{ei}^s$$

and $c_i^s = \langle h^s - h_{ave}^s, h_{ei}^s \rangle$ in which $\langle a, b \rangle$ is an inner product of a and b; and detecting the location of the feature point of the facial area by using the $c_i^s$.

5. The system of claim 4, wherein the detection unit is configured to represent a direction vector $v^{s,k}$ from a center of the segment s of the facial area to the feature point k as a combination of values of the $v_{EDV}^{s,k}$ by using $$v^{s,k} = v_{ave}^{s,k} + \sum_{i=1}^{P^s} c_i^s v_{ei}^{s,k},$$

and detect the location of the feature point of the facial area by using the $v^{s,k}$.

6. The system of claim 5, wherein the detection unit is configured to detect the location of the feature point of the facial area by determining a location coordinate of the feature point k at which the summation of the distances between the coordinate and the direction vectors from centers of the respective segments of the facial area to the feature point k.

7. A method for detecting a feature point of a face, the method comprising:
   dividing, by a training unit, each of a plurality of facial images into segments of a predetermined size;
   generating, by the training unit, an eigen-codebook representing a correlation between a feature vector of each of the divided segments and location of a predetermined feature point in the facial image;
   detecting, by a detection unit, a facial area from a target image;
   dividing, by the detection unit, the facial area into segments of a predetermined size;
   detecting, by the detection unit, a feature vector of each of the divided segments of the facial area; and
   detecting, by the detection unit, a location of a feature point in the facial area by using the detected feature vector and the eigen-codebook;
   wherein the generating of the eigen-codebook comprises:
   obtaining $M^s = [h_1^s, \ldots, h_n^s]$ by applying a predetermined feature point detection algorithm to each segment of the facial image;
   obtaining $M_E^s = [h_{ave}^s, h_{e1}^s, \ldots, h_{eP^s}^s]$ by applying Principal Component Analysis (PCA) algorithm to the $M^s$; and
   generating the eigen-codebook by using the $M^s$ and the $M_E^s$,
   wherein $h_n^s$ is data of a feature vector of a segment s of a $n^{th}$ facial image, M is a matrix, $h_{ave}^s$ is an average among data $h_1^s \ldots$ and $h_n^s$, $h_{eP^s}^s$ represents a piece of eigen data obtained by applying the PCA algorithm to data $h_1^s$ ... and $h_n^s$, and when a piece of eigen data $h_{ei}^s$ has an eigen value of $\lambda_{ei}^s$, $\lambda_{e1}^s > \ldots > \lambda_{eP}^s$, and $P^s$ is a total number of data $h_{e1}^s$ ... and $h_{eP}^s$.

8. The method of claim 7, wherein the generating of the eigen-codebook by using $M^s$ and the $M_E^s$ comprises:
calculating $C^s$ that represents a correlation between the $M^s$ and the $M_E^s$ and satisfies $M^s \cdot C^s = M_E^s$ in which · represents a matrix multiplication; and
generating the eigen-codebook by using the $C^s$.

9. The method of claim 8, wherein the generating of the eigen-codebook by using the $C^s$ comprises:
calculating a direction vector $V^{s,k}$ from a center of the segment s of the $n^{th}$ facial image to a predetermined feature point k of the facial image, the direction vector $V^{s,k}$ satisfying $V^{s,k} = [v_1^{s,k}, \ldots, v_n^{s,k}] \in \Re^{2 \times n}$, and
calculating $V_{EDV}^{s,k}$ by using $V_{EDV}^{s,k} = V^{s,k} \cdot C^s$, wherein the eigen-codebook includes the $V_{EDV}^{s,k}$.

10. The method of claim 9, wherein the detecting of a location of a feature point comprises:
obtaining $h^s$ by applying a predetermined feature point detection algorithm to each segment of the facial area;
obtaining $c_i^s$ by representing the $h^s$ as a combination of values of the $M_E^s$ by using $$h^s \approx h_{ave}^s + \sum_{i=1}^{P^s} c_i^s h_{ei}^s$$

and $c_i^s = \langle h^s - h_{ave}^s, h_{ei}^s \rangle$ in which $\langle a, b \rangle$ is an inner product of a and b; and
detecting the location of the feature point of the facial area by using the $c_i^s$.

11. The method of claim 10, wherein the detecting of the location of the feature point of the facial area by using the $c_i^s$ comprises:
representing a direction vector $v^{s,k}$ from a center of the segment s of the facial area to the feature point k as a combination of values of the $V_{EDV}^{s,k}$ by using $$v^{s,k} = v_{ave}^{s,k} + \sum_{i=1}^{P^s} c_i^s v_{ei}^{s,k};$$

and
detecting the location of the feature point of the facial area by using the $v^{s,k}$.

12. The method of claim 11, wherein in the detecting of the location of the feature point of the facial area by using the $v^{s,k}$, the location of the feature point of the facial area is detected by determining a location coordinate of the feature point k at which the summation of the distances between the coordinate and the direction vectors from centers of the respective segments of the facial area to the feature point k.

* * * * *